United States Patent [19]
Slavin et al.

[11] 3,804,470
[45] Apr. 16, 1974

[54] SPEED LOGIC FOR AN ADAPTIVE BRAKING SYSTEM

[75] Inventors: Michael Slavin, Gloucester Point; Ralph W. Carp, Glendale, both of Va.; Thomas C. Schafer, South Bend, Ind.

[73] Assignee: The Bendix Corporation, Southfield, Mich.

[22] Filed: Aug. 1, 1972

[21] Appl. No.: 277,001

[52] U.S. Cl. .......................... 303/21 BE, 188/181 C
[51] Int. Cl. .................................................. B60t 8/08
[58] Field of Search............. 188/181 C; 303/20, 21; 317/5; 324/161; 340/52 R, 53, 248 A, 263

[56] References Cited
UNITED STATES PATENTS

| | | | |
|---|---|---|---|
| 3,650,575 | 3/1972 | Okamoto ..................... | 188/181 C X |
| 3,604,761 | 9/1971 | Okamoto et al. ........... | 303/21 BE X |
| 3,717,384 | 2/1973 | Harned......................... | 303/21 P X |
| 3,574,417 | 4/1971 | Howard et al. .................. | 303/21 BE |
| 3,663,070 | 5/1972 | Scharlack....................... | 303/21 P |
| 3,690,735 | 9/1972 | Arai et al. .................... | 188/181 C X |
| 3,701,569 | 10/1972 | Arai et al. .................... | 188/181 C X |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

An adaptive braking system for wheeled vehicles, such as automobiles, uses signals proportional to wheel speed to control braking during incipient wheel skid conditions. A capacitor whose decay rate is controlled is used to memorize a signal correlated to wheel speed. Generally, the memorized signal will be maintained at a fixed offset at a value less than an instantaneous wheel speed signal. After braking pressure is applied the instantaneous wheel speed may drop more rapidly than the memory capacitor can follow. If the instantaneous wheel speed signal drops through the memorized signal, braking pressure is attenuated. The memorized signal will now track the instantaneous wheel speed signal downward maintaining a further fixed offset where the memorized signal is greater than the instantaneous wheel speed signal. In response to the attenuated braking pressure wheel speed will increase while the memorized signal will continue to decay at its predetermined schedule so that eventually the instantaneous wheel speed signal will exceed the memorized signal at which time braking pressure will be restored. With the instantaneous speed signal now greater than the memorized signal, the memorized signal will track the instantaneous speed signal at the first mentioned offset.

19 Claims, 6 Drawing Figures

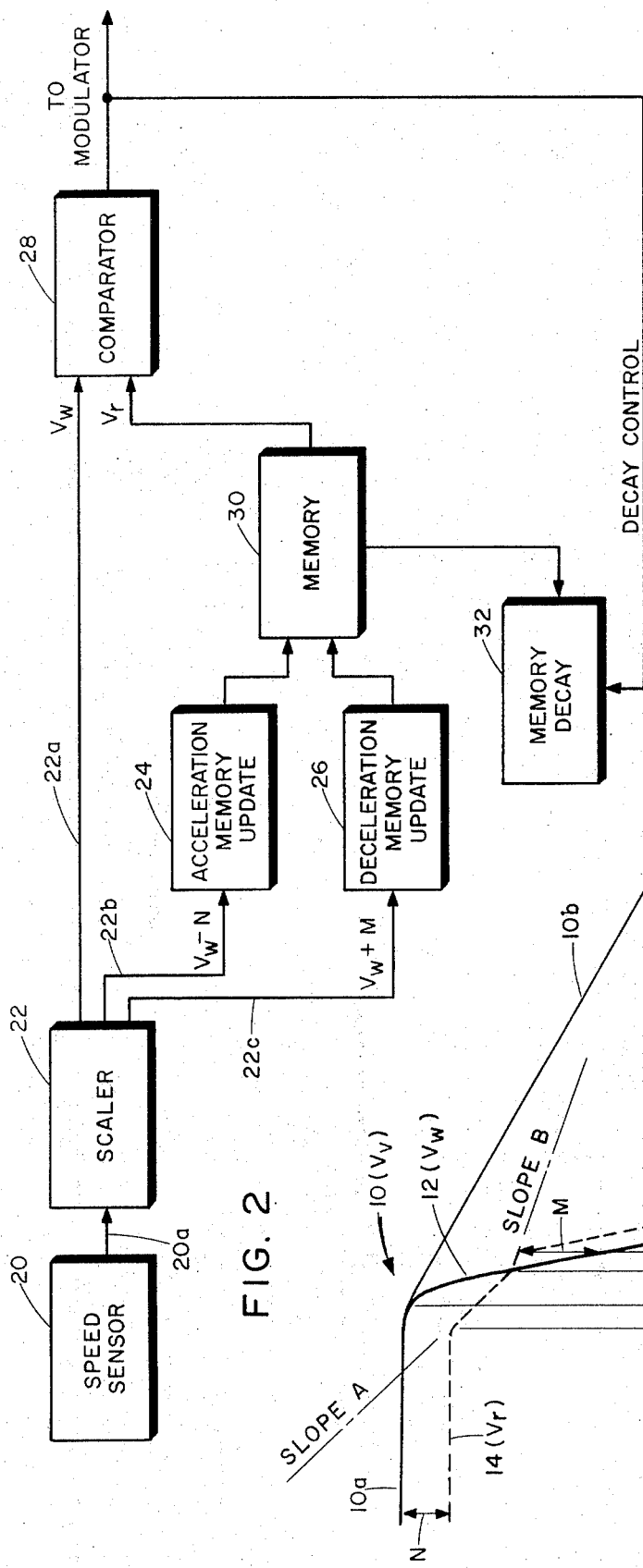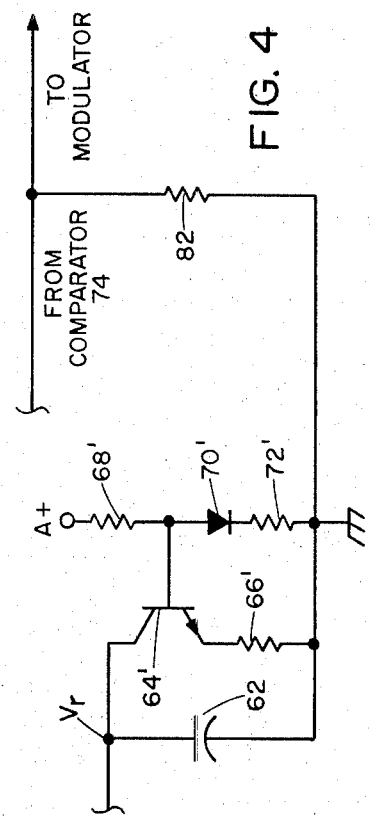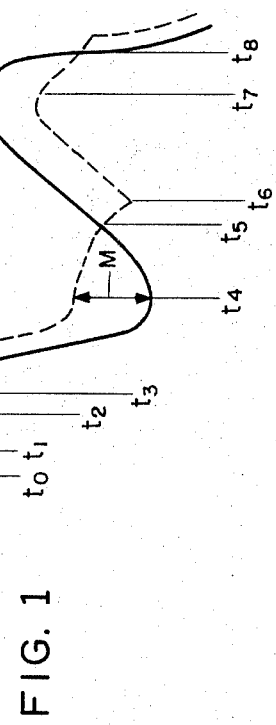

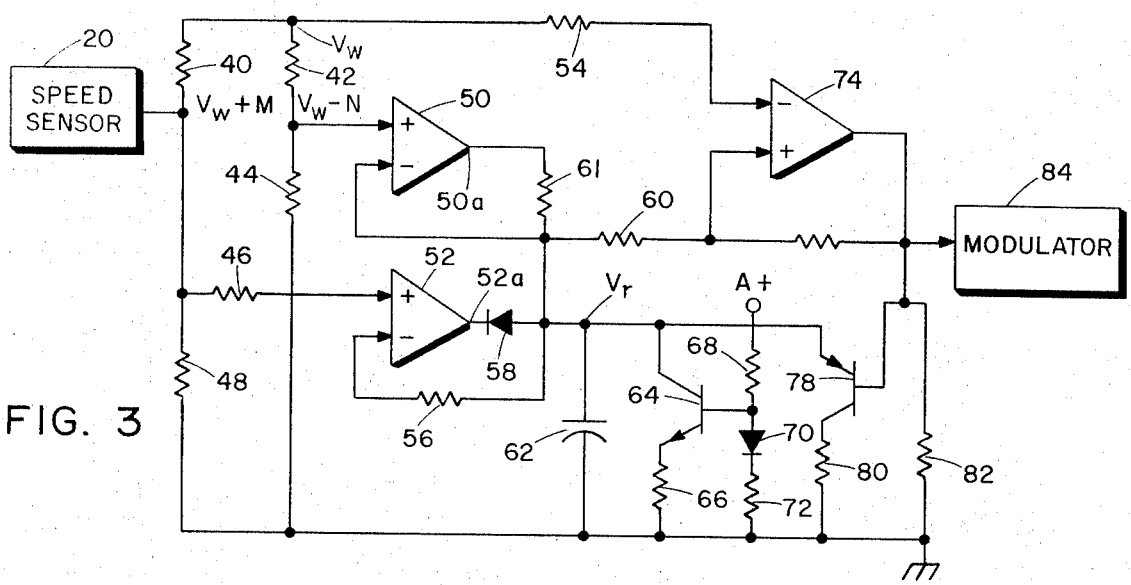
FIG. 3
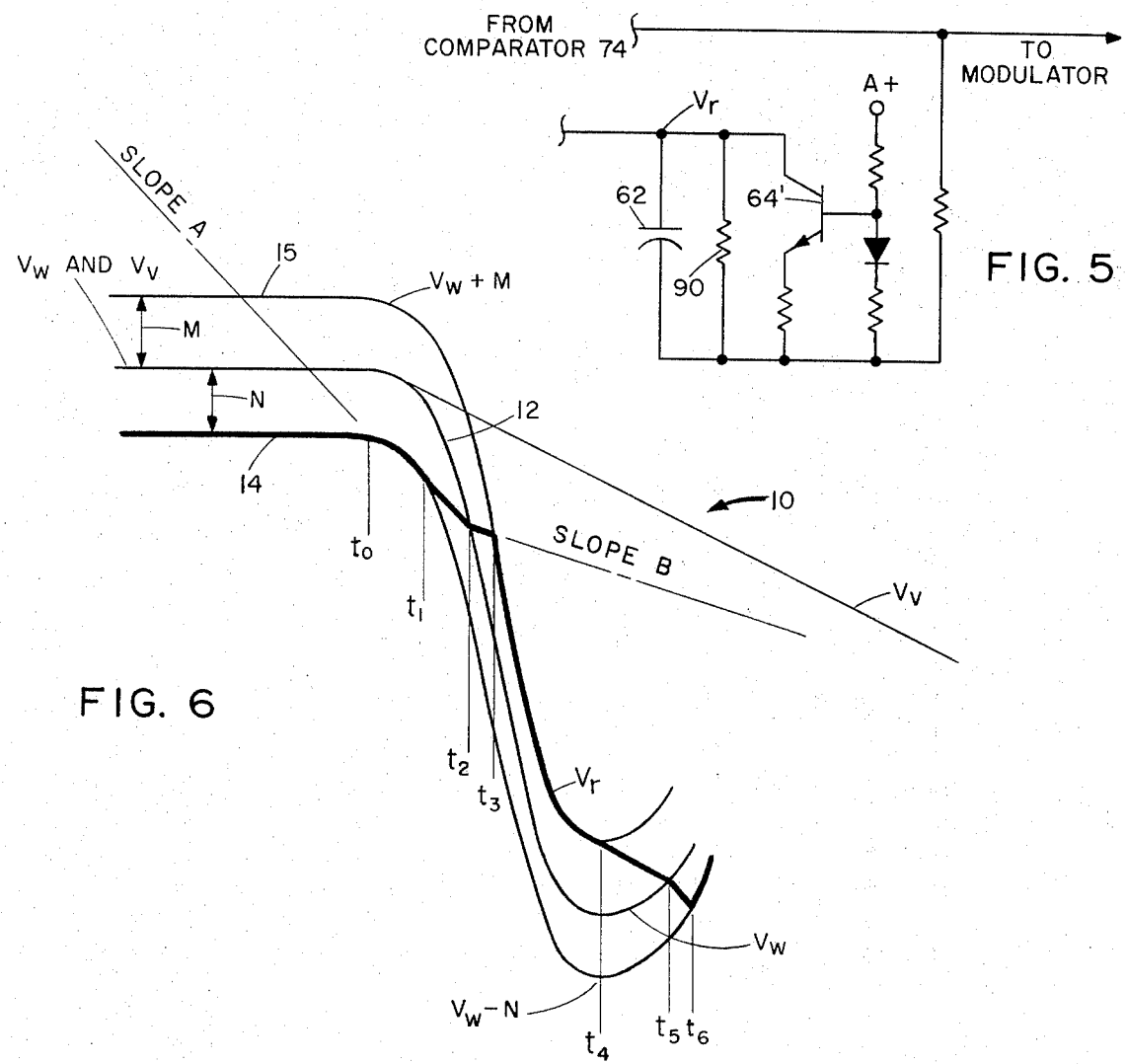
FIG. 5
FIG. 6

SPEED LOGIC FOR AN ADAPTIVE BRAKING SYSTEM

BACKGROUND OF THE INVENTION

This invention relates to adaptive braking systems for wheeled vehicles, such as automobiles and the like, which operate on wheel speed logic. More particularly, the invention comprises speed logic in an adaptive braking system where a memorized signal related to wheel speed tracks instantaneous wheel speed upward and downward.

Various logic schemes for vehicle anti-skid devices have been devised. Perhaps the simplest logic is used in a vehicle having an unbraked wheel such that the unbraked wheel speed is at all times related to vehicle speed. In this case, a speed signal from a braked wheel is compared with a speed signal from the unbraked wheel. The braking is then controlled so that the braked wheel speed is a predetermined amount less than the unbraked wheel speed. Of course, in automobiles, trucks and the like which have no unbraked wheel this type of logic cannot be used. In this latter class of vehicles which have no unbraked wheel both deceleration and speed logic schemes have been devised. The deceleration logic schemes use a signal related to wheel deceleration for controlling vehicle braking during incipient skid conditions. The speed logic systems generally include means for generating an artificial signal approximately proportional to vehicle speed during braking. This can be accomplished by charging a capacitor to a voltage proportional to instantaneous wheel speed before braking occurs and by allowing the capacitor to discharge either at a fixed rate or at a rate controlled by vehicle deceleration during braking.

Certain of the adaptive braking systems controlled by deceleration logic have provided excellent braking characteristics albeit at a relatively higher cost. Those adaptive braking systems controlled by speed logic have generally been characterized by their less expensive cost.

SUMMARY OF THE INVENTION

This invention provides an adaptive braking system wherein speed logic is used to control vehicle braking during incipient wheel skid conditions. In the description to follow the terms wheel speed signal, speed signal and related terms are used to designate a signal proportional to a rotational speed, such as wheel speed, axle speed, the average of various individual rotational speeds, a selected one of various rotational speeds, etc. One skilled in the art, from the description to follow, will be readily able to adapt the invention to the available speed signal.

In the invention to be described a speed signal is generated, suitably by tachometer means, various ones of which are well known to those skilled in the art. In the embodiment shown the speed signal is a d.c. voltage.

Generally the control concept is based on direct comparison of the speed signal against an internally generated reference signal which is a function of both the positive and negative slopes of the speed signal. The internally generated reference signal decays at a rate determined by associated circuitry at times when it is not a function of the positive and negative slopes of the speed signal. The above concept is embodied by a voltage divider whose output comprises not only the speed signal but the speed signal increased by an amount herein designated M and by a further signal comprised of the speed signal decreased by an amount herein designated N. A reference memory is provided for tracking either the speed signal increased by M or the speed signal decreased by N, depending upon the relation of the speed signal with respect to the reference signal contained in the reference memory. When the speed signal is greater than the reference memory signal the reference memory will track the speed signal less N. When the speed signal is less than the reference memory signal the reference memory will track the speed signal plus M.

In addition to the above, both the decay rate and the build rate of the reference memory is limited. It is thus possible for the speed signal to pass through the reference memory signal. When this cross-through occurs while the speed signal is decreasing the adaptive braking system operates to attenuate braking pressure. When the cross-through occurs while the speed signal is increasing, the adaptive braking system operates to restore braking pressure.

It is thus an object of this invention to provide an adaptive braking system controlled by speed logic.

It is a further object of this invention to provide an adaptive braking system having means for generating an internal reference speed signal which is compared against an instantaneous speed signal.

A further object of this invention is to provide an adaptive system having an internally generated reference speed signal which is a function of both the positive and negative slopes of a wheel speed signal.

One more object of this invention is to provide an adaptive braking system of the type described wherein the internally generated reference speed signal can decay only at a limited rate when it is not a function of the positive and negative slopes of the wheel speed signal.

One more object of this invention is to provide an adaptive braking system of the type described which is compatible with known existing braking systems.

It is a further object of this invention to provide an adaptive system which will cause braking pressure to be modulated in response to wheel speed signals.

These and other objects of this invention will become apparent to one skilled in the art upon a reading and understanding of the following disclosure.

BRIEF DESCRIPTION OF THE DRAWINGS

FIG. 1 shows speed curves which are helpful in explaining the operation of the invention.

FIG. 2 is a block diagram of an embodiment of the invention.

FIG. 3 is a modified schematic which embodies the invention.

FIGS. 4 and 5 are partial schematics which illustrate alternative embodiments of the invention.

FIG. 6 shows parts of the speed curves previously seen in FIG. 1 and is helpful in explaining the operation of the invention as embodied in FIG. 2.

DESCRIPTION OF THE PREFERRED EMBODIMENT

Refer to the various drawings wherein like reference numerals refer to like elements and refer particularly to FIG. 1. In that figure a curve 10 is an idealized representation of vehicle velocity $V_v$ with respect to time and wherein a horizontal portion 10a represents the relatively constant velocity prior to braking and the downward ramping portion 10b represents the decreasing vehicle speed after braking. In the figure braking force is applied at $t_0$. A curve 12 represents the speed signal $V_w$ which as aforementioned is derived from the speed of a wheel or wheels, and prior to braking coincides with the vehicle speed curve 10a. However, after braking at $t_0$ the speed signal decreases more rapidly than the vehicle speed as is required to brake the vehicle. A further curve 14 represents the internally generated reference speed signal $V_r$. For clarity curve 14 is shown as a dashed-line. Construction lines representing respectively slopes A and B are shown for reference and indicate the maximum allowed decay rate of the reference speed signal for various conditions as will be described below.

It will be noted that prior to $t_0$ the speed signal represented by curve 12 is offset from the reference speed signal represented by curve 14 by an amount N. At $t_0$, that is at the time braking force is applied, curve 12 decays rapidly indicating that the vehicle wheels are decelerating at an excessive rate. Curve 14 is limited in its decay rate to follow slope A and hence at time $t_1$, where the decay of curve 12 become greater than slope A the offset N can no longer be maintained. Eventually, in this example, the speed signal 12 intercepts the reference signal 14 at $t_2$. It will be noted that during the time curve 12 is above curve 14, curve 14 is allowed to decay along slope A. However, after curve 12 intercepts curve 14, that latter curve is limited to decay along slope B. It will be noted that slope A is somewhat steeper than the ramping portion 10b, while slope B is somewhat less than ramping portion 10b. These relative degrees of slope are shown for the purposes of illustrating the invention and should not be interpreted to limit the invention. The system designer is free to choose the slope or slopes most advantageous to his embodiment of the invention and in fact may even make slope A equal to slope B without departing from the invention. The specific embodiments to follow will illustrate various means available to the designer to achieve the slopes desired.

Continuing with the description of FIG. 1, at $t_2$ curve 12 passes through curve 14 and braking force is attenuated. Subsequently curve 14 decays along slope B while curve 12 continues to decline at a higher rate indicating that brake force attenuation has not been effective due to inherent system delays of the type known to those skilled in the art. At $t_3$ curve 12 is offset from curve 14 by an amount designated M. At that time curve 14 will track curve 12 offset by the amount M.

At $t_4$ the brake force attenuation has become effective and curve 12 begins to turn upward indicating that the wheel is beginning to accelerate towards vehicle speed. The offset M between curves 12 and 14 can no longer be maintained and curve 14 ceases to track curve 12. Since curve 12 is still below curve 14, curve 14 decays along slope B until curve 12 intercepts curve 14 at $t_5$ at which time curve 14 commences decay along slope A. Also at $t_5$ the adaptive braking system operates to restore braking force. However, the restoration of braking force is not immediately effective and the wheel speed continuous to increase toward vehicle speed as indicated by the rising of curve 12. At $t_6$ an offset N between curves 12 and 14 is again achieved and curve 14 thereafter tracks curve 12. This tracking of curve 14 with curve 12 continues until time $t_7$ when, the restoration of braking forc having become effective, curve 12 again turns downward with a slope greater than slope A. Since at this time curve 14 is limited to decaying along slope A curve 12 eventually intercepts curve 14 again at $t_8$ at which time the adaptive braking system operates to once again attenuate the braking force. The logic continues to operate in a manner similar to that already described until the vehicle is brought to a stop or the braking operation is otherwise terminated.

In summary, prior to time $t_1$ and between times $t_6$ and $t_7$ $$V_4 = V_w - N$$

while between times $t_3$ and $t_4$ $$V_r = V_w + M.$$

Refer now to FIG. 2 which shows a block diagram illustrating an embodiment of the invention. In this figure a speed sensor 20, which as aforementioned generates a speed signal proportional to the speed of a vehicle wheel or group of wheels, is suitable of the type known to those skilled in the art to comprise a tachometer generator and a filter means for generating a d.c. voltage at line 20a proportional to speed. The speed signal passes through a scaler 22, having an output 22a on which appears the speed signal, an output 22b on which appears the speed signal less a quantity N, and an output 22c on which appears the speed signal plus a quantity M. M and N may be, for example, a fixed number of miles per hour, a percentage of the speed signal $V_w$, or a combination of both as desired by the system designer and is illustrated in the specific circuitry to be shown.

A memory 30 generates a reference speed signal $V_r$ in a manner to be described. The signal $V_r$ is applied together with the speed signal $V_w$ to comparator 28 which generates an output when the speed signal $V_w$ passes through the reference signal $V_r$. The comparator output signal is applied to a brake force modulator (not shown), to attenuate braking force. The comparator output may also be applied to a memory decay 32. Memory decay 32 limits the rate at which the reference signal $V_r$ generated by memory 30 may decay. The limits of this decay rate, as previously described, are along slope A when speed signal $V_w$ is greater than the reference signal $V_r$ and along slope B when speed signal $V_w$ is less than reference signal $V_r$. Of course, if slope A is made equal to slope B or otherwise not responsive to the comparator output, this output need not connect to memory decay 32.

An acceleration memory update 24 is generally effective while the speed signal is increasing to impress the signal $V_w-N$ into memory 30. A deceleration memory update 26 is generally effective while the speed signal is decreasing to impress the signal $V_w+M$ into memory 30. The interrelationship of acceleration memory 24, deceleration memory 26, memory decay 32 and memory 30 was described in broad terms with respect to FIG. 1 and will be described more particularly below. In summary, however, the acceleration memory update is effective to impress the signal $V_w-N$ into memory 30 so long as the speed signal $V_w$ does not decay at an excessive rate as determined by memory decay 32. If decay becomes excessive then memory decay 32 controls until the memorized signal $V_r$ equals $V_w+M$ whereafter deceleration memory update 26 becomes effective to impress the signal $V_w+M$ into memory 30 so long as the speed signal $V_w$ continues to decrease.

Refer now to FIG. 3 which shows a modified schematic of an embodiment of the invention wherein slope A differs from slope B. The speed sensor 20 previously shown is seen supplying a d.c. voltage to the voltage divider comprised of resistors 40, 42 and 44. Since the output of speed sensor 20 is a d.c. voltage proportional to speed it is also proportional to speed plus a constant where the constant is determined by the ratio of the voltage divider. Hence, the output of the speed sensor is termed the $V_w+M$ signal previously described. Proper choice of the resistors in the resistance bridge permits the $V_w$ signal to appear at the junction between resistors 40 and 42 and the $V_w-N$ signal at the junction between resistors 42 and 44. This latter junction is connected to the non-inverting terminal of operational amplifier 50 connected to have a unity gain. A feedback resistor 61 is connected between the operational amplifier 50 output terminal 50a and its inverting input terminal. Operational amplifier 50 and resistor 61 comprise the acceleration memory update 24 of FIG. 2. Operational amplifier 50 is connected so that its output terminal 50a is a current supply. That is, current can be supplied from terminal 50a into resistor 61 but cannot be delivered from resistor 61 into terminal 50a. Operational amplifiers connected as current supplies and having unity gain are well known in the art. The inventing terminal of operational amplifier 50 is also connected to one plate of the memory capacitor 62 whose other plate is connected to ground.

The $V_w+M$ signal is applied through resistor 46 to the non-inverting input terminal of an operational amplifier 52 also connected to have unity gain. The output terminal 52a of this latter operational amplifier is connected to the cathode of diode 58 whose anode is connected to memory capacitor 62 first plate. The anode of diode 58 is also connected in feedback relationship through resistor 56 to the inverting terminal of operational amplifier 52. A parallel ground return path of the $V_w+M$ signal is provided by resistor 48. Operational amplifier 52 together with resistor 56 and diode 58 comprise the deceleration memory update 26 of FIG. 2. Operational amplifier 52 is connected so that its output terminal 52a is a current sink. Diode 58 permits current to flow from capacitor 62 into terminal 52a only when $V_r$ is high enough with respect to $V_w+M$ to overcome the diode voltage drop. This diode voltage drop is relatively small and is generally ignored in this description.

The $V_w$ signal is applied through resistor 54 to the inverting input terminal of operational amplifier 74 connected as a comparator. The first plate of memory capacitor 62 is connected through resistor 60 to the non-inverting terminal of operational amplifier 74. In this embodiment it is preferable that resistor 60 be made equal to resistor 54 so that the signal memorized by capacitor 62, that is, the reference speed signal $V_r$, is compared directly against the $V_w$ signal.

Memory capacitor 62 is shunted by the collector emitter circuit of NPN transistor 64 and resistor 66 connected between the emitter of the transistor and ground. The base electrode of transistor 64 is connected through resistor 68 to a positive voltage terminal indicated as A+ and through the serial connection of diode 70 and resistor 72 to ground. Transistor 64 together with its associated elements comprise a constant current generator which provides the slope B decay rate of memory capacitor 62.

A PNP transistor 78 having an emitter collector circuit connected serially with resistor 80 across memory capacitor 62 provides a second current source for memory capacitor 62. The base electrode of transistor 78 is connected through resistor 82 to ground and also to the output terminal of operational amplifier 74. When both transistors 64 and 78 are conductive, memory capacitor 62 is permitted to decay therethrough along slope A. This occurs when $V_w$ is greater than $V_r$ and operational amplifier 74 generates an output at or near ground. When $V_r$ is greater than $V_w$ operational amplifier 74 produces a high output signal which back-biases transistor 78 and permits memory capacitor 62 to decay along slope B. The high output signal from operational amplifier 74 also energizes the braking force modulator 84. Various braking force modulators are known to those skilled in the art and the specific type of modulator used does not comprise a limitation of this invention, the type modulator used being an option of the system designer.

Refer now also to FIG. 6 which shows portions of the curves of FIG. 1 and is helpful in understanding the operation of the invention as embodied in FIG. 3. In FIG. 6 curve 14, which is a time graph of the $V_w-N$ signal, is again seen along with curve 12 which is a time graph of the $V_w$ signal and curve 10 which is a graph of vehicle velocity $V_v$. As is apparent from the circuit of FIG. 3 curve 14 is vertically displaced at all times from curve 12 by the quantity N while curve 15 is vertically displaced from curve 12 by the quantity M.

As before, braking force is applied at $t_0$. The $V_w$ signal coincides and follows $V_v$ prior to that time and up to $t_0$ at which time the speed signal $V_w$ illustrated by curve 12 departs from $V_v$. Prior to $t_1$ curve 14 has tracked the $V_w$ signal. The means for tracking can be seen in FIG. 3 where the output of operational amplifier 50 is less than the output of operational amplifier 52 so that diode 58 is back-biased and capacitor 62 follows the output of operational amplifier 50. Of course, during this time, that is prior to $t_1$, $V_w$ is greater than $V_r$ so that comparator 74 produces no output. During this time, of course, transistors 64 and 78 are conductive. However, charges are supplied to capacitor 62 by operational amplifier 50 much faster than they can be bled off by these transistors. At $t_1$ the slope of curve 12 and hence curve 14 exceeds the slope of slope A. In other words, with respect to FIG. 3, charges are now bled through transistors 64 and 78 faster than can be supplied from terminal 50a. As soon as $V_r$ becomes greater than $V_w-N$ the signal at the inverting input terminal of operational amplifier 50 becomes larger than the signal at the non-inverting input terminal and the current supply at output terminal 50a is shut off. At that time, capacitor 62 is no longer able to track along curve 14 but rather tracks down slope A so that curve 12 ($V_w$) and curve $V_r$ approach one another. At $t_2$ these two curves intersect, that is $V_r$ becomes equal to $V_w$ and comparator 74 generates an output which acts through modulator 84 to attenuate the braking force. Additionally, the output from comparator 74 also biases transistor 78 off so that only transistor 64 is conductive and memory capacitor 62 now decays along slope B. At $t_3$ reference voltage $V_r$ becomes equal to $V_w+M$ so that diode 58 becomes forward biased. The reference signal $V_r$ stored across capacitor 62 will follow curve 15, that is the $V_w+M$ signal. At $t_4$, which is the low point of the various curves, since the output of operational amplifier 52 comprises a current sink, $V_r$ is no longer able to follow that output and will at that time once again decay along slope B to $t_5$ when $V_r$ again becomes equal to $V_w$ and the output of comparator 74 is extinguished. This permits transistor 78 to become conductive so that $V_r$ now decays along slope A until it becomes equal to $V_w-N$ at which time operational amplifier 50 will again supply current to the memory capacitor 62 and $V_r$ will once again follow curve 14.

Refer now to FIG. 4 which shows a modification of the invention wherein slope A is equal to slope B. In this figure the PNP transistor 78 together with its collector resistor 80 has been omitted. Memory capacitor 62 is now shunted by the single current source comprised of transistor 64' and emitter resistor 66' together with the base electrode circuit comprised of resistor 68', diode 70' and resistor 72' connected across the A+ voltage. If this memory decay is used with the invention the break in the decay slopes experienced in FIGS. 1 and 6 when $V_r$ passes through $V_v$ will be eliminated and the decay slope will be constant as $V_r$ varies between curves 14 and 15.

Refer now to FIG. 5 which shows a further modification of the memory decay. In this figure memory capacitor 62 is shunted not only by the current source 64' but also by a resistor 90. Current source 64' contributes a constant slope decay for capacitor 62 while resistor 90 contributes a decay which varies with the value of $V_r$, the decay being greater for large values of $V_r$. Thus, in the curves of FIG. 6 the slope of $V_r$ as it decays between curves 14 and 15 will be greater for high values of $V_r$ and will become less at low values of $V_r$. The advantage of this arrangement can be seen when it is considered that wheels braked on a slippery or otherwise low frictional coefficient surface tend to decelerate rapidly and thus the speed signal $V_w$ will decrease rapidly. Since $V_w$ is low the slope of reference signal $V_r$ will be relatively shallow and will intercept $V_w$ relatively soon in the braking cycle. On the other hand, when the wheels are braked on a high frictional coefficient surface wheel speed remains closer to vehicle speed and decelerates less rapidly. In this case the slope of reference signal $V_r$ as it moves from curve 14 to curve 15 of FIG. 6 will be relatively steeper and the braking force will be attenuated relatively later in the braking cycle. This delay in attenuating the braking force in response to the wheel frictional force is considered advantageous in adaptive braking systems by those skilled in the art.

It should be obvious from the above description of the preferred embodiment that various modifications and alterations of the invention can be made. For example, the memory decay slopes can be as shown or can be made responsive to some other vehicle or wheel parameter. Similarly, the quantities M and N might be made responsive to various vehicle or wheel conditions. One skilled in the art can make certain other changes and modifications without departing from the teachings of our invention. We therefore intend to cover all such changes and modifications which fall within the true scope and spirit of the appended claims.

The invention claimed is

1. In a wheeled vehicle braked by a braking force, an adaptive braking system including means for controlling said braking force at least in response to wheel speed, said adaptive braking system additionally comprising:
   means for generating a first signal proportional to said wheel speed;
   means for generating a second signal off-set from said first signal in a direction indicative of greater wheel speed;
   means for generating a third signal off-set from said first signal in a direction indicative of lesser wheel speed;
   a memory device normally storing a selected one of said second and third signals, said memory device including means for limiting the rate of change of the signal stored in said device in a direction indicative of decreasing wheel speed while said third signal is selected and for subsequently selecting said second signal if said third signal changes faster than said memory device is permitted by said means for limiting and for limiting the rate of change of the signal stored in said device in a direction of increasing wheel speed while said second signal is selected and for subsequently selecting said third signal if said second signal changes faster than permitted by said means for limiting; and
   means comparing said first signal with the stored signal for controlling said braking force.

2. The adaptive braking system of claim 1 wherein said first, second and third signals comprise d.c. voltage levels and said memory device comprises a capacitor.

3. The adaptive braking system of claim 2 wherein said means for limiting comprises a current generator shunting said capacitor.

4. The adaptive braking system of claim 2 wherein said means for limiting comprises current conductive means responsive to said first signal and the stored signal for controlling the leakage of current across said capacitor.

5. The adaptive braking system of claim 2 wherein said means for limiting comprises means responsive to the stored signal for controlling the leakage of current across said capacitor.

6. The adaptive braking system of claim 5 wherein said means for controlling comprises a resistor shunting said capacitor.

7. In a wheeled vehicle braked by a braking force, an adaptive braking system comprising:
   means for generating first, second and third d.c. voltage levels proportional to wheel speed comprising first, second and third signals respectively, said second and third signals being off set from said first signal to have higher and lower d.c. levels respectively;
   charge storage means for generating a fourth d.c. voltage level comprising a fourth signal;
   current supply means for supplying charges to said charge storage means in response to said third signal;
   means shunting said charge storage means for removing charges therefrom;

means at least responsive to said second signal for withdrawing charges from said charge storage means; and, means responsive to said first and fourth signals for controlling said braking force.

8. The adaptive braking system of claim 7 wherein said means for withdrawing charges responds also to said fourth signal whereby charges are withdrawn while said fourth signal exceeds said second signal.

9. The adaptive system of claim 7 wherein said current supply means is inactivated when said fourth signal exceeds said third signal.

10. The adaptive braking system of claim 7 wherein said means for controlling said braking force additionally controls said means shunting.

11. In a wheeled vehicle braked by a braking force, an adaptive braking system comprising:

means for generating first, second and third d.c. voltage levels proportional to wheel speed and comprising first, second and third signals, said second and third signals being offset from said first signal to have higher and lower d.c. levels respectively;

a capacitor;

means for impressing said third signal on said capacitor at least before said third signal decays at a rate exceeding a maximum decay rate;

means for decaying the signal impressed on said capacitor at a lesser rate than the decay rate of said third signal after said third signal decays at a rate exceeding said maximum decay rate and until the signal impressed on said capacitor reaches a predetermined relationship with said second signal;

means for subsequently impressing said second signal on said capacitor at least so long as said second signal changes in a direction of decreasing wheel speed; and, means responsive to the signal impressed on said capacitor and said first signal for controlling said braking force.

12. The adaptive braking system of claim 11 wherein said means for decaying comprises a current source shunting said capacitor.

13. The adaptive braking system of claim 12 wherein means for controlling additionally controls said current source.

14. The adaptive braking system of claim 11 wherein said means for impressing said third signal on said capacitor comprises means for supplying current to said capacitor in response to said third signal and wherein said means for impressing said second signal on said capacitor comprises a current sink.

15. The adaptive braking system of claim 14 wherein said means for impressing said second signal on said capacitor includes a diode connecting said current sink to said capacitor.

16. In a wheeled vehicle braked by a braking force, an adaptive braking system comprising:

means for generating first, second and third d.c. voltage levels proportional to wheel speed and comprising first, second and third signals, said second and third signals being off set from said first signal to have higher and lower d.c. levels respectively;

a capacitor having a first plate connected to a constant voltage terminal, and a second plate;

first converter means having a current supply first output terminal and connected to impress said third signal on said first output terminal, said first converter means including a resistor connecting said first output terminal to said second plate;

second converter means having a current sink second output terminal and connected to impress said second signal on said second output terminal, said second converter means including a diode connecting said second output terminal to said second plate;

means for shunting current between said first and second plates; and, means responsive to the signal on said second plate for controlling said braking force.

17. The adaptive braking system of claim 16 wherein said means for shunting includes a current source.

18. The adaptive braking system of claim 17 wherein said means for shunting includes a resistor shunting said current source.

19. The adaptive braking system of claim 17 wherein said current source is controlled by said means for controlling.

* * * * *